United States Patent

Tanigaki et al.

(10) Patent No.: US 9,187,050 B2
(45) Date of Patent: Nov. 17, 2015

(54) HARNESS ROUTING STRUCTURE FOR ELECTRIC VEHICLE

(71) Applicant: Nissan Motor Co., Ltd., Yokohama-shi, Kanagawa (JP)

(72) Inventors: Tatsunori Tanigaki, Yamato (JP); Nobuhiro Mori, Odawara (JP); Hideharu Ogawa, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/411,921

(22) PCT Filed: Aug. 8, 2013

(86) PCT No.: PCT/JP2013/071573
§ 371 (c)(1),
(2) Date: Dec. 30, 2014

(87) PCT Pub. No.: WO2014/045754
PCT Pub. Date: Mar. 27, 2014

(65) Prior Publication Data
US 2015/0144414 A1    May 28, 2015

(30) Foreign Application Priority Data

Sep. 18, 2012   (JP) ................................. 2012-204194

(51) Int. Cl.
*B60R 16/02*       (2006.01)
*B60K 1/04*        (2006.01)
(Continued)

(52) U.S. Cl.
CPC ............... *B60R 16/0215* (2013.01); *B60K 1/04* (2013.01); *B60R 16/0222* (2013.01);
(Continued)

(58) Field of Classification Search
CPC   B60R 16/0215; B60R 16/0222; B60R 16/02; B60R 16/0207; B62D 25/20; B62D 21/17; B60K 1/04; B60K 2001/0438; B60K 2001/0433; H02G 3/00; H02G 3/04
See application file for complete search history.

(56) References Cited

U.S. PATENT DOCUMENTS

| 6,598,691 B2 * | 7/2003 | Mita ........................ B60K 1/00 180/65.1 |
| 7,094,970 B2 * | 8/2006 | Kihira ................. B60L 11/1803 174/74 R |

(Continued)

FOREIGN PATENT DOCUMENTS

| JP | 6-199183 A | 7/1994 |
| JP | 2011-25863 A | 2/2011 |

(Continued)

*Primary Examiner* — James M Dolak
(74) *Attorney, Agent, or Firm* — Global IP Counselors, LLP

(57) ABSTRACT

A harness routing structure for an electric vehicle is provided with a floor panel, a below-floor component, an above-floor component and a harness. The floor panel partitions a cabin space and a below-floor space. The floor panel has a harness through-hole. The below-floor component is disposed below the floor panel. The above-floor component is disposed above the floor panel and further toward a front of the vehicle than the below-floor component. The harness electrically connects the below-floor component and the above-floor component. The harness runs through the through-hole. The harness through-hole is located, with respect to a vehicle-lengthwise direction of the floor panel, in an intermediate position between a below-floor harness connection position of the below-floor component to a first end of the harness and an above-floor harness connection position of the above-floor component to a second end of the harness.

18 Claims, 9 Drawing Sheets

(51) Int. Cl.
*H02G 3/04* (2006.01)
*B62D 25/20* (2006.01)
*B60L 11/18* (2006.01)

(52) U.S. Cl.
CPC ............... *B62D 25/20* (2013.01); *H02G 3/04* (2013.01); *B60K 2001/0438* (2013.01); *B60L 11/1877* (2013.01); *B60Y 2306/01* (2013.01)

(56) References Cited

U.S. PATENT DOCUMENTS

| | | | | |
|---|---|---|---|---|
| 7,172,042 B2 * | 2/2007 | Yamaguchi | ............. | B60K 6/48 180/65.1 |
| 7,561,445 B2 * | 7/2009 | Yajima | ................. | B60K 6/445 174/72 A |
| 7,654,352 B2 * | 2/2010 | Takasaki | ................ | B60K 1/04 180/65.1 |
| 8,481,856 B2 * | 7/2013 | Yamaguchi | ............ | B60K 13/04 174/102 R |
| 8,561,296 B2 * | 10/2013 | Oga | .................... | B60R 16/0207 174/72 A |
| 8,561,743 B2 | 10/2013 | Iwasa et al. | | |
| 8,624,114 B2 * | 1/2014 | Oga | .................... | B60R 16/0215 174/72 A |
| 8,831,808 B2 * | 9/2014 | Stanek | .................. | H02J 7/0047 180/65.1 |
| 9,006,939 B2 * | 4/2015 | Toyama | ............. | B60R 16/0215 307/147 |
| 9,018,793 B2 * | 4/2015 | Tanahashi | ................ | H02G 3/00 307/9.1 |
| 9,033,083 B2 * | 5/2015 | Kashiwagi | .......... | B60L 11/1816 180/68.5 |
| 2011/0133548 A1 * | 6/2011 | Toyama | ............. | B60R 16/0215 307/9.1 |

FOREIGN PATENT DOCUMENTS

| | | |
|---|---|---|
| JP | 2011-63147 A | 3/2011 |
| JP | 2011-68187 A | 4/2011 |
| JP | 2011-126451 A | 6/2011 |
| JP | 2011-166906 A | 8/2011 |
| JP | 2012-39689 A | 2/2012 |
| JP | 2012-178930 A | 9/2012 |
| WO | 2010/098271 A1 | 9/2010 |

* cited by examiner

HARNESS ROUTING STRUCTURE FOR ELECTRIC VEHICLE

CROSS-REFERENCE TO RELATED APPLICATIONS

This application is a U.S. National stage application of International Application No. PCT/JP2013/071573, filed Aug. 8, 2013, which claims priority to Japanese Patent Application No. 2012-204194 filed in Japan on Sep. 18, 2012. The entire disclosure of Japanese Patent Application No. 2012-204194 is hereby incorporated herein by reference.

BACKGROUND

1. Field of the Invention

The present invention relates to a harness routing structure for electric vehicle, in which a pair of vehicle-mounted components disposed above and below a floor panel are connected by way of a harness running through the floor panel.

2. Background Information

There is known in the art a harness routing structure for an electric vehicle, the harness routing structure comprising a pair of vehicle-mounted components disposed above and below a floor panel, a harness connecting between the pair of vehicle-mounted components, and a harness through-hole formed in the floor panel and used for the harness to run through (see, for example, Japanese Laid-Open Patent Application No. 2011-25863).

SUMMARY

In a conventional harness routing structure for an electric vehicle, the vehicle-mounted component disposed above the floor panel may shift to the rear of the vehicle in the event of a front collision. The relative positional relationship between the vehicle-mounted component above the floor and the harness through-hole that the harness runs through might change in such cases, and a load may be applied to the harness.

The present invention was created in view of this problem, it being an object thereof to provide a harness routing structure for an electric vehicle capable of reducing a load acting on the harness running through the floor panel in the event of a front collision.

In order to achieve the above object, the harness routing structure for an electric vehicle of the present invention comprises a below-floor component, an above-floor component, a harness, and a harness through-hole. The below-floor component is disposed below a floor panel. The above-floor component is disposed above the floor panel and further toward the front of the vehicle than the below-floor component. The harness connects the below-floor component and the above-floor component. The harness through-hole is formed on the floor panel and the harness runs through the through-hole. The harness through-hole is set in an intermediate position in the vehicle-length direction between a below-floor harness connection position of the below-floor component where one end of the harness is connected and an above-floor harness connection position of the above-floor component where the other end of the harness is connected.

In this harness routing structure for an electric vehicle, the above-floor component disposed above the floor panel is disposed in a position further toward the front of the vehicle than the below-floor component disposed below the floor panel. Therefore, in the event of a front collision, the load of the collision inputted from the front of the vehicle acts on the above-floor component, which moves to the rear of the vehicle. Meanwhile, inertia acts on the below-floor component accompanying the front collision, which shifts to the front of the vehicle. In contrast, the harness through-hole formed in the floor panel for the harness to run through is set in an intermediate position in the vehicle-length direction between the below-floor harness connection position where one end of the harness is connected and the above-floor harness connection position where the other end of the harness is connected. Therefore, the below-floor harness connection position and the harness through-hole come into relative proximity during a front collision. The above-floor harness connection position and the harness through-hole also come into relative proximity. The harness thereby deforms in a flexible direction both above and below the floor panel. As a result, there is no pulling or twisting of the harness, and the load acting on the harness therefore can be reduced.

BRIEF DESCRIPTION OF THE DRAWINGS

Referring now to the attached drawings which form a part of this original disclosure.

DETAILED DESCRIPTION OF THE EMBODIMENTS

Figure 1:
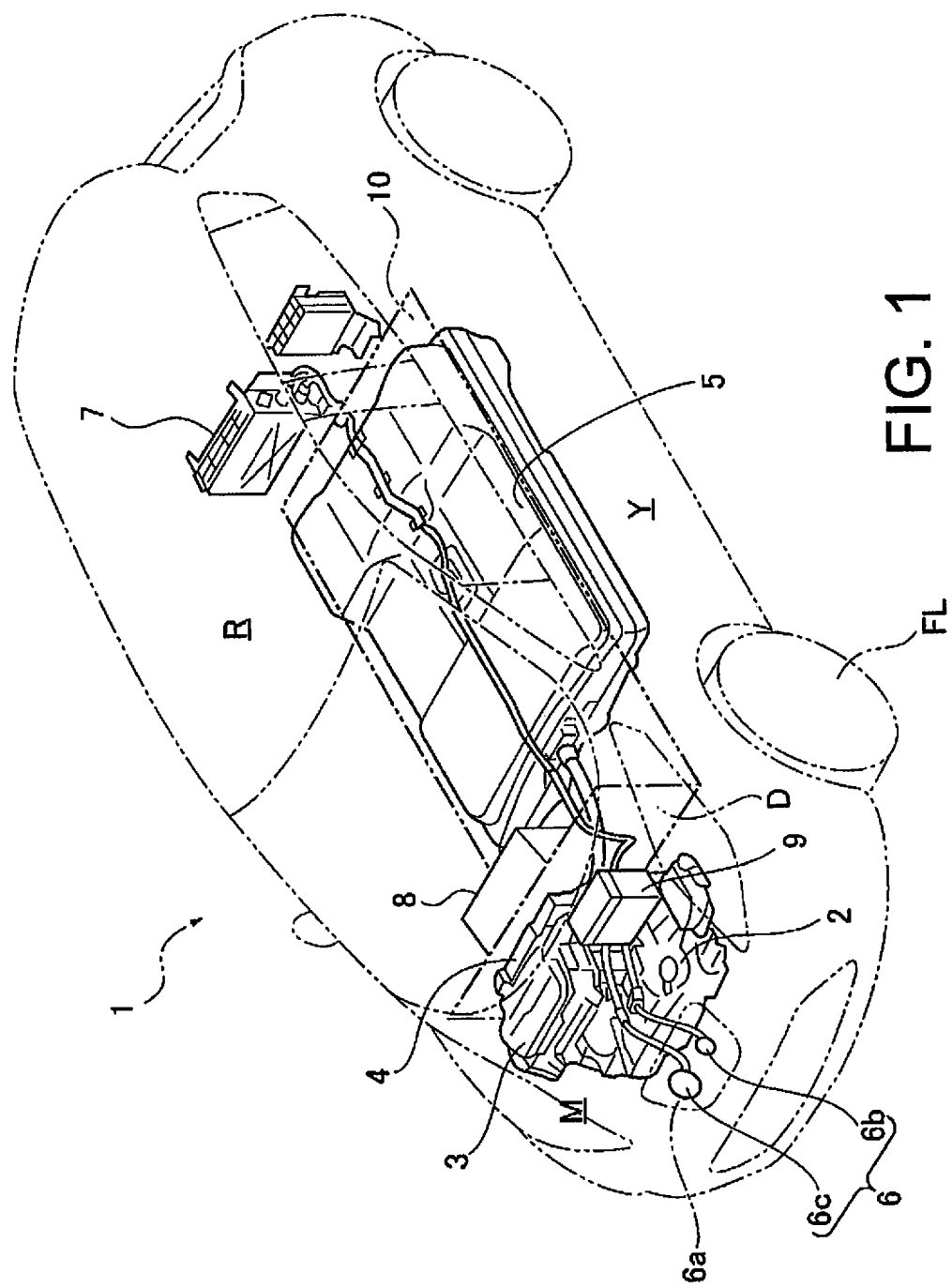
FIG. 1 is an overall perspective view of a main structure of an electric vehicle in which the harness routing structure is applied in accordance with a first embodiment.

Preferred embodiments of a harness routing structure for an electric vehicle is described below based on illustrated embodiments in the drawings.

First Embodiment

The configuration of the harness routing structure for an electric vehicle of embodiment 1 is described separately under "Overall configuration of the electric vehicle," "Configuration of the battery pack," "Configuration of the air conditioning unit," "Routing configuration of the strong-current harness," and "Configuration of the grommet."

Overall Configuration of the Electric Vehicle

FIG. 1 is an overall perspective view illustrating the main structure of an electric vehicle in which the harness routing structure is applied in accordance with the first embodiment. The overall configuration of the electric vehicle is described below with reference to FIG. 1 in accordance with the first embodiment.

The electric vehicle (electric vehicle) of the first embodiment is provided with a drive motor (travel motor) 2, a drive motor inverter 3, a DC/DC junction box 4, a battery pack (below-floor component) 5, a charging port 6, a vehicle-mounted charger 7, and an air conditioning unit 8, as illustrated in FIG. 1. Reference symbol "9" in FIG. 1 indicates a 12-volt vehicle-mounted battery.

The drive motor 2 is a power source for running of the electric vehicle 1, and is disposed in a motor compartment M provided at the front of the vehicle. An output shaft (not shown), of the drive motor 2 is connected to left and right front wheels FL (other side not shown), which are drive wheels. When a positive torque instruction is outputted to the drive motor inverter 3, the drive motor 2 performs a drive operation to generate drive torque using power discharged from the battery pack 5, and drives the left and right front wheels FL (other side not shown) (power running). Meanwhile, when a negative torque instruction is outputted to the drive motor inverter 3, the drive motor 2 performs a power generation operation to convert rotational energy from the left and right front wheels FL (other side not shown) to electrical energy, and uses the generated power as power for charging the battery pack 5 (regeneration).

The DC/DC junction box 4 has a DC/DC converter inside, and distributes high-voltage power discharged from the battery pack 5, supplies power to a 12-volt power source system, and charges the 12-volt vehicle-mounted battery 9. The DC/DC junction box 4 also has a normal charging relay and a high-speed charging relay, and is capable of switching the charging circuit in tune with the charging mode.

The battery pack 5 is disposed below a floor panel 10 partitioning a cabin space R and a below-floor space Y, in other words, in the below-floor space Y, and here, in a middle position of the wheelbase. The battery pack 5 serves as a power source of the drive motor 2 and also serves as a power source of a PTC heater 84 (see FIG. 3A) stored inside the air conditioning unit 8. The detailed configuration of the battery pack 5 is to be described later.

The charging port 6 is a location of connection of a charging connector connected to a charging stand, home charging equipment, or other extravehicular power source, and is provided in the middle at the front of the vehicle, and is covered by a port lid 6a to be capable of opening and closing. The charging port 6 here has a normal charging port 6b and a high-speed charging port 6c. The normal charging port 6b is a charging port used when charging using home charging equipment, a normal charging stand, or the like, and is connected to the DC/DC junction box 4 by way of the vehicle-mounted charger 7. The high-speed charging port 6c is a charging port used when charging using a high-speed charging stand, or the like, and is directly connected to the DC/DC junction box 4.

The air conditioning unit 8 is disposed above the floor panel 10, in other words, in the cabin space R, and is disposed further toward the front of the vehicle than the battery pack 5. Here, the air conditioning unit is disposed between a dashboard panel D partitioning the motor compartment M and the cabin space R, and, here, an instrument panel not shown. The air conditioning unit 8 forces temperature-conditioned air into the cabin space R. The detailed configuration of the air conditioning unit 8 is to be described later.

Configuration of the Battery Pack

Figure 2:
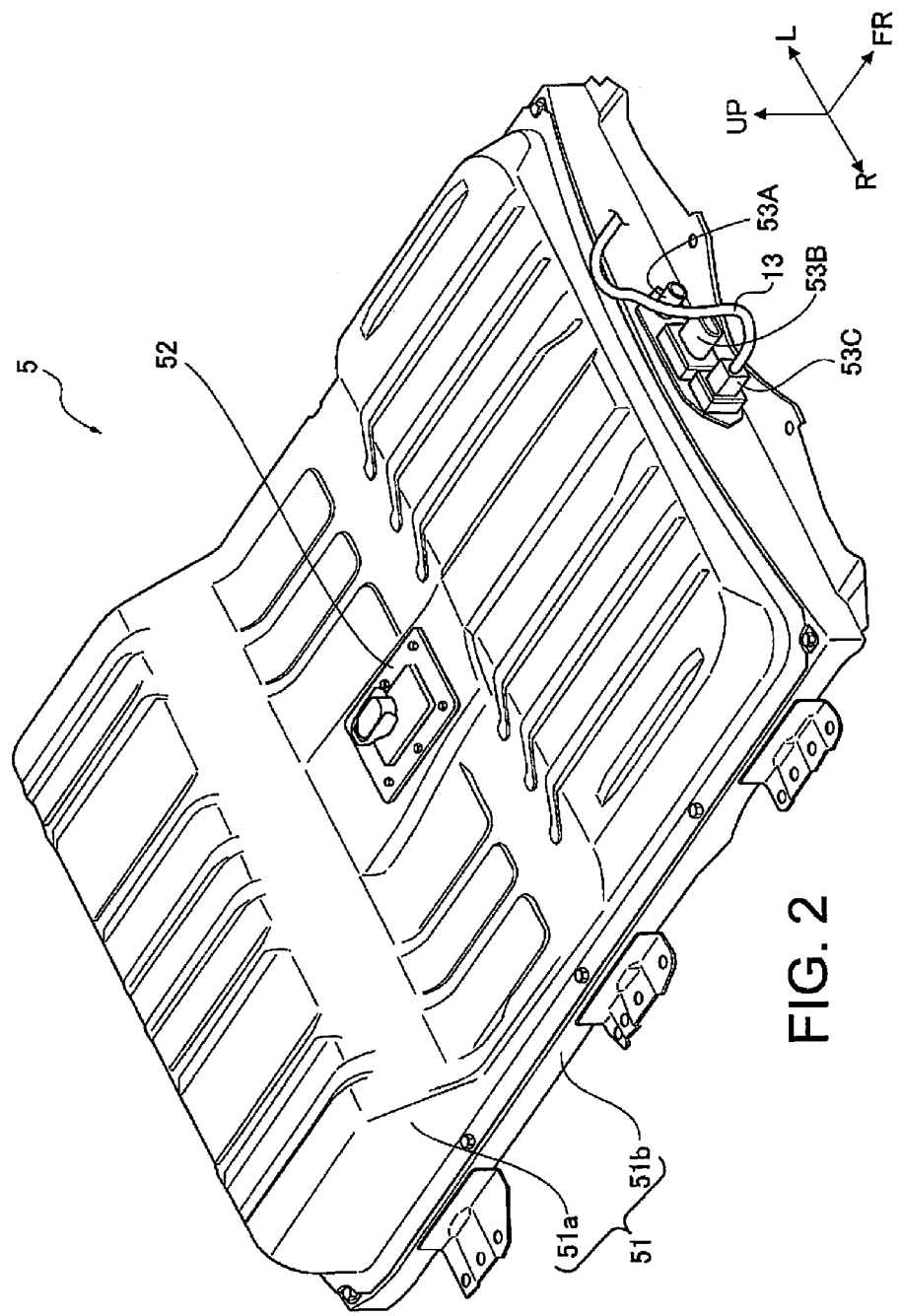
FIG. 2 is an external perspective view of the battery pack in accordance with the first embodiment.

FIG. 2 is an external perspective view illustrating the battery pack of embodiment 1. In the drawing, "FR" indicates the front of the vehicle, "UP" indicates upward of the vehicle, "R" indicates to the right of the vehicle, and "L" indicates to the left of the vehicle. The configuration of the battery pack of embodiment 1 is described below with reference to FIG. 2.

The battery pack 5 of embodiment 1 is provided with a battery case 51 and a service disconnect switch 52 (hereinafter referred to as "SD switch"), as illustrated in FIG. 2.

The battery case 51 is a case storing a battery module, junction box, and lithium ion battery controller (not shown), and is configured with two parts: a lower frame 51a and an upper cover 51b. The battery module is an aggregate structure in which are stacked a plurality of battery cells using secondary cells (lithium ion batteries, or the like).

The lower frame 51a is a frame member supported and fixed on a vehicle body member. The lower frame 51a has a space formed by a rectangular recessed part for mounting the battery module, and the like. A light-current connector terminal 53A, a charge-discharge connector terminal 53B, and a strong-current connector terminal 53C are attached to a front-end edge of the lower frame 51a.

The upper frame 51b is a cover member fixed by bolt to an outer perimeter position of the lower frame 51a. The upper cover 51b is provided with a cover face having an irregular step surface shape corresponding to an irregular height shape of the battery module, and the like, mounted on the lower frame 51a.

The SD switch 52 is disposed in a middle region of the battery case 51, as illustrated in FIG. 2, and is a switch for mechanically cutting a strong-current battery circuit by manual operation. The strong-current battery circuit is formed by connecting together by way of a bus bar a battery module having an internal bus bar, the junction box, and the SD switch 52. The SD switch 52 is switched on and off by manual operation when performing inspection, repair, parts replacement, or the like, of the DC/DC junction box 4, the PTC heater 84, or the like.

The light-current connector terminal 53A is connected with a light-current harness (not shown) connecting the junction box stored inside the battery case 51 and an external electrical control system.

The charge-discharge connector terminal 53B is connected with one end of a charge-discharge harness (not shown) connected to the DC/DC junction box 4. The charge-discharge harness is connected to the junction box stored inside the battery case 51.

The strong-current connector terminal 53C is connected with one end of a strong-current harness (harness) 13 connected to the PTC heater 84, which is an external strong-current component. The strong-current harness 13 is connected to the junction box stored inside the battery case 51 inside the battery pack 5.

Configuration of the Air Conditioning Unit

Figure 3A:
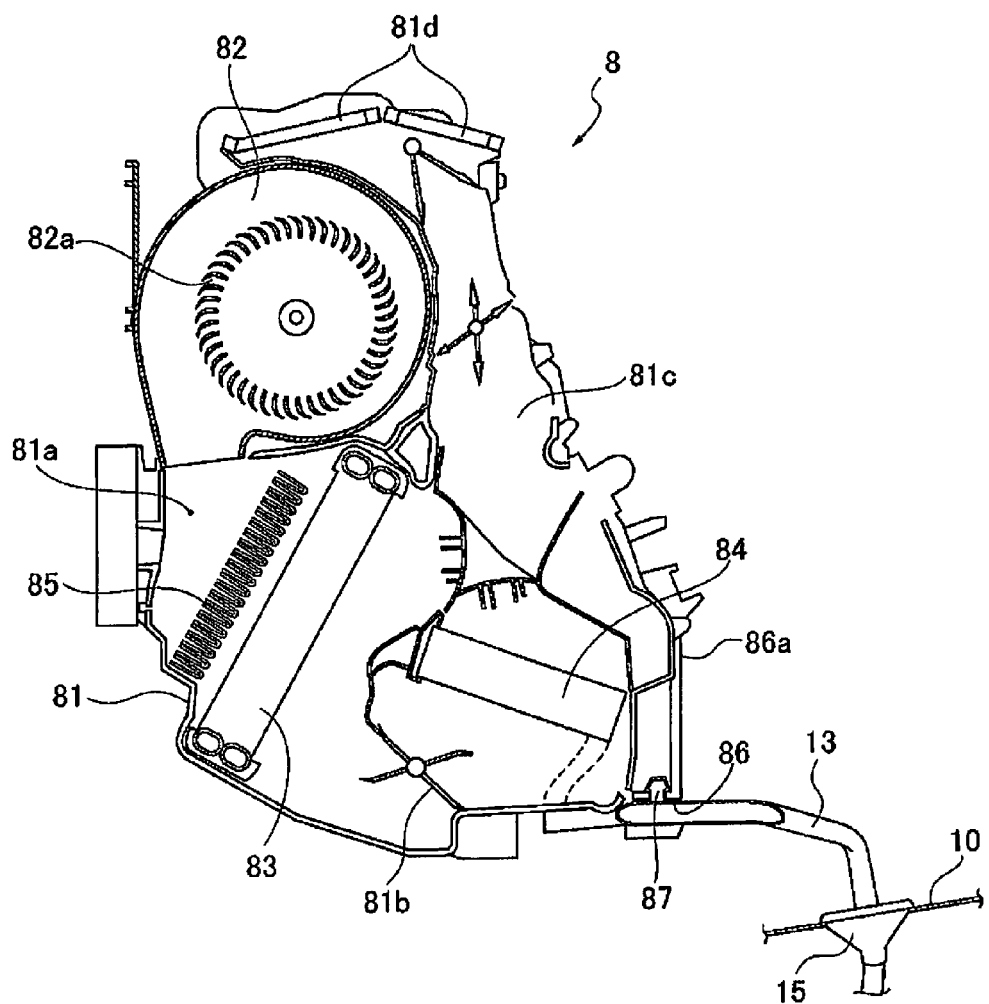
FIG. 3A is a sectional view of the air conditioning unit in accordance with the first embodiment.
Figure 3B:
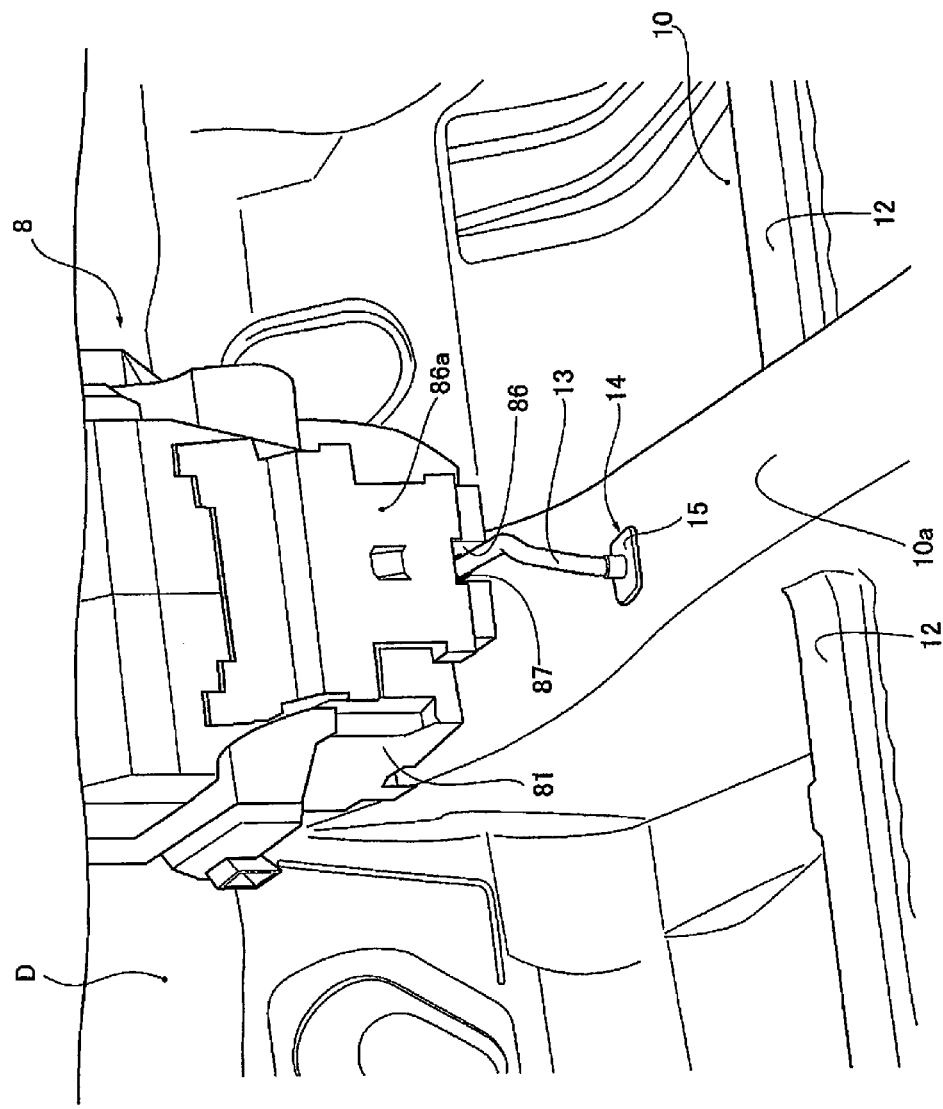
FIG. 3B is a rear perspective view of the air conditioning unit in accordance with the first embodiment.

FIG. 3A is a sectional view illustrating the air conditioning unit of embodiment 1. FIG. 3B is a rear perspective view illustrating the air conditioning unit of embodiment 1. The configuration of the air conditioning unit of embodiment 1 is described below with reference to FIGS. 3A and 3B.

The air conditioning unit 8 of embodiment 1 includes a unit housing 81, a fan unit 82, an evaporator 83, an expansion valve (not shown), and the PTC heater 84, as illustrated in FIG. 3A. In FIG. 3A, reference symbol "85" indicates an air cleaner. The air conditioning unit 8 is installed in the vehicle-widthwise middle position of the dashboard panel D, and in a position above a floor tunnel 10a formed in the floor panel 10, as illustrated in FIG. 3B.

The unit housing 81 is a case having a forced air duct 81a formed inside, and the air cleaner 85, evaporator 83, air-mixing door 81b, and PTC heater 84 are disposed in the stated order midway along the forced air duct 81a. A temperature-conditioned air duct 81c, through which flows temperature-conditioned air conditioned by the evaporator 83 and the PTC heater 84, is formed on the downstream side of the PTC heater 84. The temperature-conditioned air duct 81c communicates with a plurality of blow-out ports formed on the instrument panel, by way of a plurality of upper forced air ports 81d formed on an upper part of the unit housing 81. The unit housing 81 furthermore has an insertion part 86 for the strong-current harness 13 to be inserted through, formed on a lower part of a rear face 86a facing the rear of the vehicle (see FIG. 3B).

The fan unit 82 includes a fan motor (not shown), and a fan 82a that is rotatably driven by the fan motor, and the fan unit sends air into the unit housing 81. The air sent in flows through the inside of the forced air duct 81a.

Through the evaporator 83 and expansion valve flows a coolant produced by a cooling cycle of a vehicle-mounted air conditioning system (not shown), the air flowing through the forced air duct 81a being cooled.

In the PTC heater 84, current is passed to a PTC (Positive Temperature Coefficient) element for generating heat by passage of current, whereby the air on the downstream side of the evaporator 83 is heated. The heating wire of the PTC heater 84 is directly connected with the strong-current harness 13 extending from the battery pack 5 inside the unit housing 81.

Here, the strong-current harness 13 is fixed by a clip 87 (see FIG. 3A) inside the insertion part 86 in order to prevent vibration or shifting of position.

Routing Configuration of the Strong-Current Harness

Figure 4:
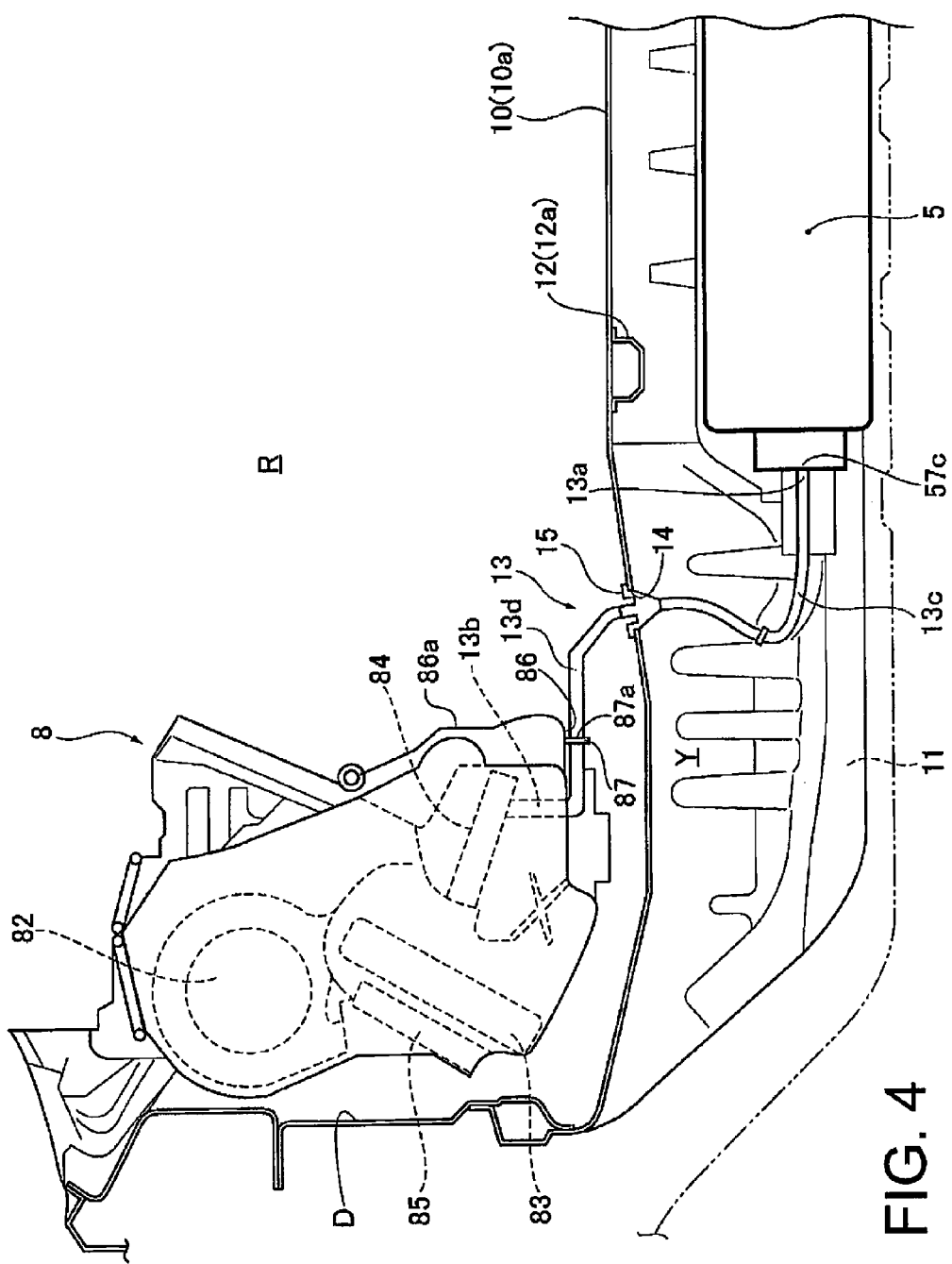
FIG. 4 is a side view of the main parts illustrating the electric vehicle in which the harness routing structure is applied in accordance with the first embodiment.
Figure 5:
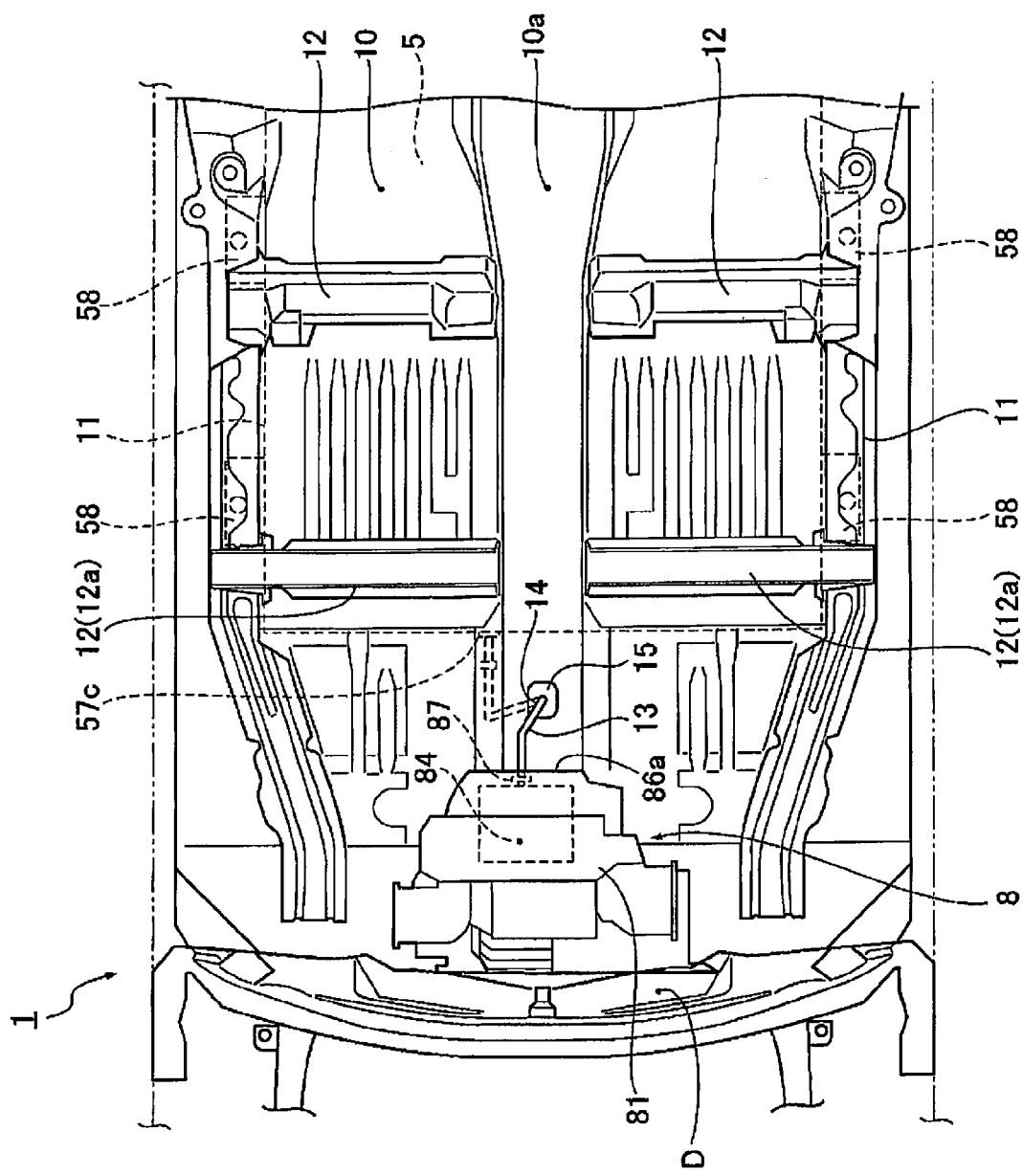
FIG. 5 is a plan view of the main parts illustrating the electric vehicle in which the harness routing structure is applied in accordance with the first embodiment.

FIG. 4 is a side view of the main parts illustrating the electric vehicle in which the harness routing structure of embodiment 1 is applied. FIG. 5 is a plan view of the main parts illustrating the electric vehicle in which the harness routing structure of embodiment 1 is applied. The configuration of the strong-current harness of embodiment 1 is described below with reference to FIGS. 4 and 5.

In embodiment 1, the battery pack 5 is disposed in the below-floor space Y partitioned on the side below the floor panel 10. Here, the side below the floor panel 10 is supported by a pair of side members 11 and 11 extending in the vehicle-length direction, as illustrated in FIG. 5. In the floor panel 10, a floor tunnel 10a extending in the vehicle-length direction is formed bulging in the vehicle-widthwise middle position, and a plurality of cross members 12, . . . extending in the vehicle-width direction are provided on both sides of the floor tunnel 10a.

The battery pack 5 disposed in the below-floor space Y is securely supported, via a bracket part 58, to the pair of side members 11 and 11 or the cross members 12. At this time, a strong-current connector terminal 57C provided on a front end part of the battery pack 5 is set in the vehicle-widthwise middle position. The air conditioning unit 8 is disposed in the cabin space R partitioned on the side above the floor panel 10 and further toward the front of the vehicle than the battery pack 5. At this time, the insertion part 86 formed on the unit housing 81 of the air conditioning unit 8 is set in the vehicle-widthwise middle position.

One end 13a of the strong-current harness 13 is connected to the strong-current connector terminal 57C, and the other end 13b of the strong-current harness 13 is directly connected to the heating wire of the PTC heater 84 inside the unit housing 81. In other words, the battery pack 5 and the PTC heater 84 are electrically connected by way of the strong-current harness 13. Here, the "strong-current harness" is a harness for connecting strong-current components, which are components having a line voltage greater than 24 volts. The harness diameter is larger, and the bending rigidity is higher, compared with a light-current harness for connecting components having a line voltage less than 24 volts.

The strong-current connector terminal 57C where one end 13a of the strong-current harness 13 is connected corresponds to the below-floor harness connection position. A position near the other end 13b of the strong-current harness 13 is fixed by the clip 87 inside the insertion part 86, and the position (hereinafter referred to as "clip-fixing position") 87a of fixing with the clip 87 corresponds to the above-floor harness connection position.

The intermediate part of the strong-current harness 13 is routed following the vehicle-length direction, and runs through a harness through-hole 14 formed in the floor panel 10. The harness through-hole 14 is formed by cutting out the floor panel 10 in a square shape in plan view, a grommet 15 being provided inside. The details of the grommet 15 are to be described later.

The position in the vehicle-length direction of the harness through-hole 14 is set in a position between the strong-current connector terminal 57C of the battery pack 5 and the clip-fixing position 87a of the air conditioning unit 8, as illustrated in FIG. 4. Here, this position is set substantially in the middle position between the strong-current connector terminal 57C and the clip-fixing position 87a. The harness through-hole 14 is formed in the upper surface of the floor tunnel 10a, and the position in the vehicle-width direction of the harness through-hole 14 is set in the vehicle-widthwise middle position of the electric vehicle 1, as illustrated in FIG. 5. That is, the distance from each of the pair of side members 11 and 11 to the harness through-hole 14 is substantially the same extent. The harness through-hole 14 is furthermore set in a position that does not interfere with the cross member 12. Here, the harness through-hole is set further toward the front of the vehicle than the front cross member 12a provided furthest toward the front of the vehicle.

The strong-current harness 13 extends in the vehicle vertical direction at the portion running through the harness through-hole 14, and an intermediate part of a lower routing portion 13c from the harness through-hole 14 to the strong-current connector terminal 57C curves in the downward direction of the vehicle, as illustrated in FIG. 4. An intermediate part of an upper routing portion 13d from the harness through-hole 14 to the clip-fixing position 87a curves in the upward direction of the vehicle. Here, the mid-course position of the lower routing portion 13c is fixed by clip to the lower side surface of the floor tunnel 10a.

Configuration of the Grommet

Figure 6A:
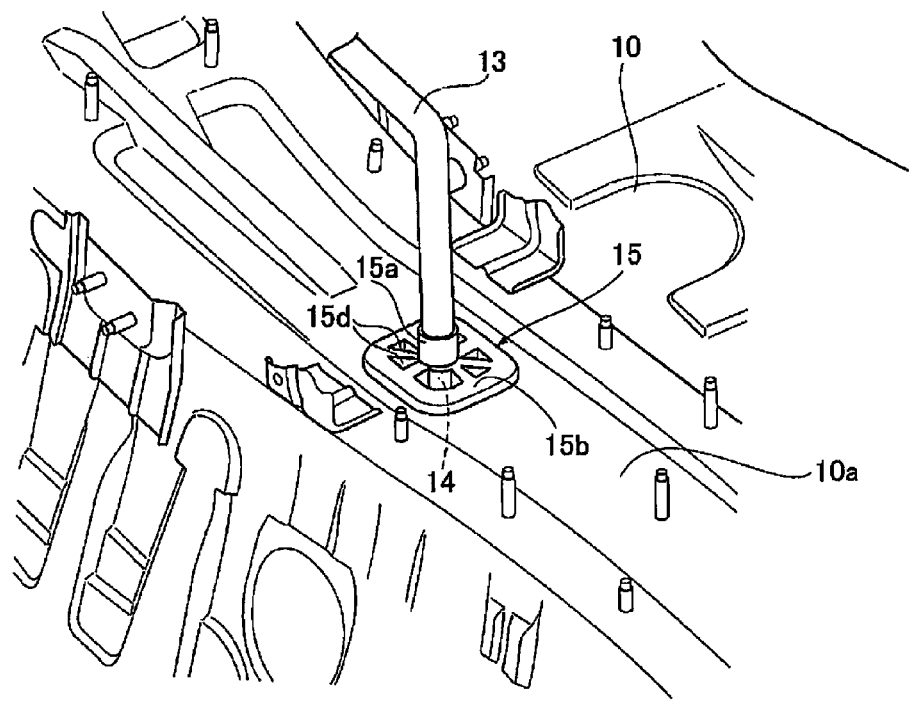
FIG. 6A is an external perspective view of the grommet in accordance with the first embodiment in the state as installed
Figure 6B:
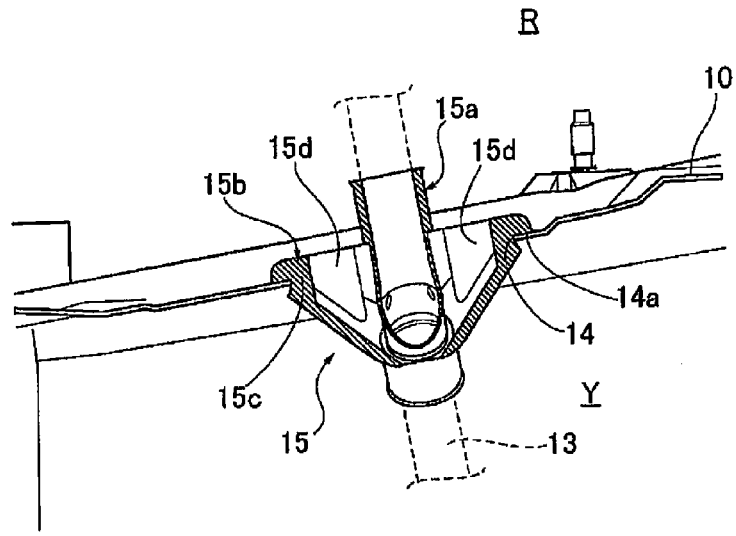
FIG. 6B is a sectional view of the grommet in accordance with the first embodiment in the state as installed.

FIGS. 6A and 6B illustrate the grommet of embodiment 1; FIG. 6A is an external perspective view in the state as installed, and FIG. 6B is a sectional view in the state as installed. The configuration of the grommet of embodiment 1 is described below with reference to FIGS. 6A and 6B.

The grommet 15 includes a tube part 15a for the strong-current harness 13 to run through, and a flange part 15b projecting from the perimeter edge of the tube part 15a to stop the harness through-hole 14, as illustrated in FIG. 6B. The grommet 15 is formed with EPDM (ethylene propylene rubber), or the like, which elastically deforms to allow flexural deformation of the strong-current harness 13. In other words, the rigidity of the grommet 15 is set lower than that of the strong-current harness 13.

The tube part 15a has a tubular shape open at both ends, and adheres closely to the outer perimeter surface of the strong-current harness 13. Here, the intermediate part of the tube part 15a curves along the direction of routing of the strong-current harness 13.

The flange part 15b has formed on a perimeter edge part an insertion-coupling part 15c for insertion-coupling to an edge part 14a of the harness through-hole 14, and the grommet 15 is fixed to the floor panel 10 by close adhesion of the insertion-coupling part 15c to the edge part 14a. The flange part 15b has formed a plurality of recessed parts 15d that project to the side below the floor panel 10 and are open to the cabin space R.

The operation is next described. The operation of the harness routing structure for an electric vehicle of embodiment 1 is described separately under "Harness routing operation during front collision" and "Harness routing operation during side collision."

Harness Routing Operation During Front Collision

A case is considered, in which the below-floor component is disposed below the floor panel, the above-floor component is disposed above the floor panel and further toward the front of the vehicle than the below-floor component, and the two components are connected by the harness running through the harness through-hole formed in the floor panel. In this case, in the event of a front collision, the above-floor component disposed at the front of the vehicle moves to the rear of the vehicle due to the impact of the collision. Meanwhile, the below-floor component shifts to the front of the vehicle due to inertia acting during the front collision. In other words, the two components respectively move, and the relative positional relationship between the above-floor component and the harness through-hole and the relative positional relationship between the below-floor component and the harness through-hole respectively change. Therefore, there was a possibility that the harness might be pulled or be forcefully brought into contact with the perimeter edge part of the harness through-hole so that the load on the harness is increased. Therefore, it is necessary to reduce the load on the harness by allowing the harness to flex in a reasonable manner in the event of a front collision. The harness routing operation during a front collision reflecting this object is described below.

Figure 7A:
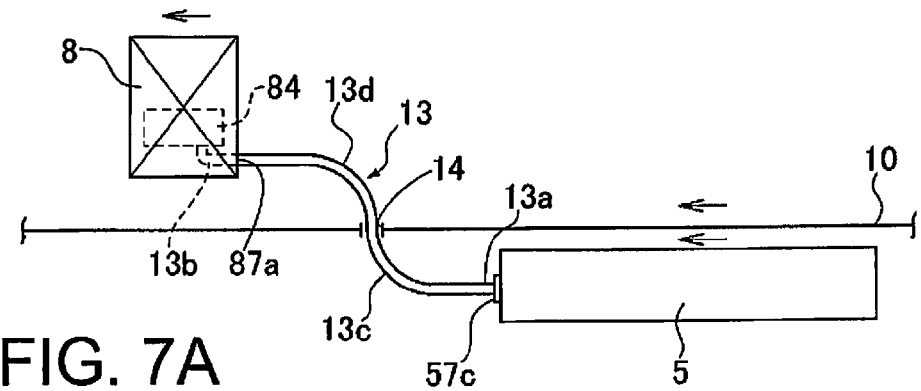
FIG. 7A is a schematic diagram of the positional relationship between the battery pack and the air conditioning unit in the event of a front collision and illustrating the state immediately after the collision.
Figure 7B:
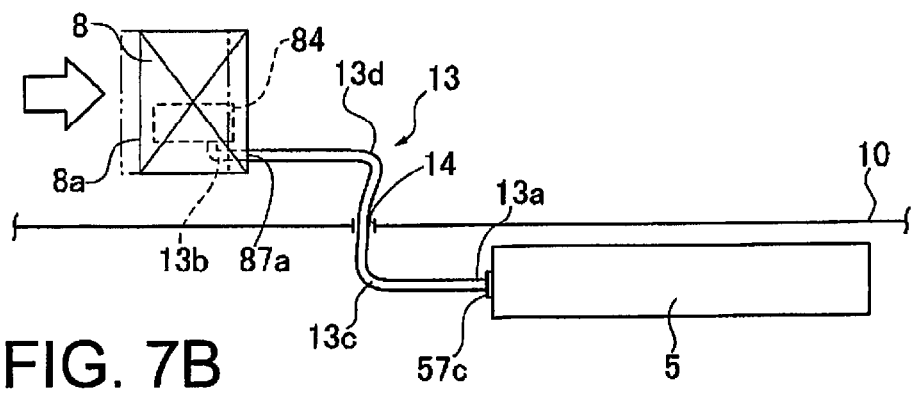
FIG. 7B is a schematic diagram of the positional relationship between the battery pack and the air conditioning unit in the event of a front collision and illustrating the state in a first period of the collision.
Figure 7C:
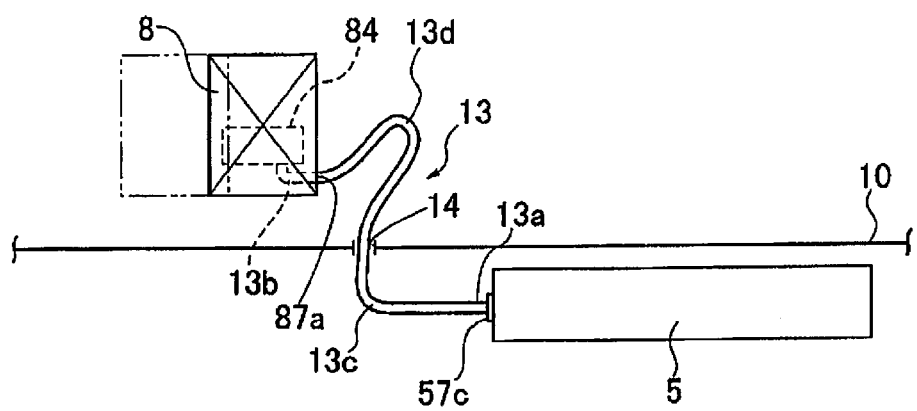
FIG. 7C is a schematic diagram of the positional relationship between the battery pack and the air conditioning unit in the event of a front collision and illustrating the state in a later period of the collision.

FIGS. 7A to 7C are schematic diagrams of the positional relationship between the battery pack and the air conditioning unit in the event of a front collision; FIG. 7A illustrates the state immediately after the collision, FIG. 7B illustrates the state in a first period of the collision, and FIG. 7C illustrates the state in a later period of the collision. The harness routing operation during a front collision in embodiment 1 is described below with reference to FIGS. 7A to 7C.

When the electric vehicle 1 is involved in a front collision, a load (hereinafter referred to as "load of collision") going from the front of the vehicle to the rear of the vehicle acts on the electric vehicle 1. Because the load of collision is input from the front end part of the vehicle, the inertia going toward the front of the vehicle acts on vehicle-mounted objects, including the air condition unit 8, the battery pack 5, the floor panel 10, and the like, immediately after the occurrence of the front collision. Because the inertia acts on all of the vehicle-mounted objects, the relative positional relationships in the vehicle-length direction among the air conditioning unit 8, the strong-current harness 13, the harness through-hole 14, and the battery pack 5 do not change, as illustrated in FIG. 7A.

In the first period of the collision, the drive motor 2, and the like, disposed in the motor compartment M at the front of the vehicle moves toward the rear of the vehicle due to the load of collision, and interferes with the air conditioning unit 8 disposed at the rear of the dashboard panel D. The air conditioning unit 8 is thereby pushed on a front face 8a, and starts to move toward the rear of the vehicle, as illustrated in FIG. 7B. The clip-fixing position 87a where the strong-current harness 13 is fixed by the clip 87 to the unit housing 81 also thereby moves toward the rear of the vehicle.

In the later period of the collision, the air conditioning unit 8 stops moving to the rear of the vehicle, and the relative distance between the air conditioning unit 8 and the battery pack 5 decreases, as illustrated in FIG. 7C.

In contrast, the strong-current harness 13 connecting the PTC heater 84 in the air conditioning unit 8 and the battery pack 5 is fixed at one end 13a to the strong-current connector terminal 57C of the battery pack 5, and is fixed at the other end 13b to the clip-fixing position 87a of the air conditioning unit 8. Because the strong-current harness 13 runs through the harness through-hole 14 in the floor panel 10, movement in the vehicle-length direction is restricted at the position where the harness through-hole 14 is formed.

At this time, the harness through-hole 14 is provided at a position between the strong-current connector terminal 57C and the clip-fixing position 87a, in other words, the harness through-hole 14 is provided further toward the rear of the vehicle than the clip-fixing position 87a. Meanwhile, because the air conditioning unit 8 moves toward the rear of the vehicle, the clip-fixing position 87a where the strong-current harness 13 is fixed also moves toward the rear of the vehicle, as described above. The clip-fixing position 87a comes closer to the harness through-hole 14 accompanying the movement of the clip-fixing position 87a toward the rear of the vehicle.

That is, both end parts in the upper routing portion 13d of the strong-current harness 13 come closer to each other following the vehicle-length direction. The intermediate part in the upper routing portion 13d of the strong-current harness 13 is thereby deformed in the flexing direction, and the strong-current harness 13 is not pulled or forcefully brought into contact with the perimeter edge of the harness through-hole 14. As a result, the load acting on the strong-current harness 13 connecting the battery pack 5 and the PTC heater 84 during a front collision can be reduced.

Inertia going toward the front of the vehicle acts also on the battery pack 5 disposed in the below-floor space Y below the floor panel 10 accompanying the incidence of a front collision (see FIG. 7A). However, here, the relative position to the floor panel 10 substantially does not change because the battery pack 5 is fixed to the vehicle members (the pair of side members 11 and 11 and the cross member 12) (see FIG. 7B).

The relative positional relationship between the harness through-hole 14 and the strong-current connector terminal 57C connected with the strong-current harness 13 thereby does not change, and the positional relationship in the vehicle-length direction of both end parts in the lower routing portion 13c of the strong-current harness 13 does not change. As a result, the strong-current harness 13 is not pulled or forcefully brought into contact with the perimeter edge of the harness through-hole 14, and the load acting on the strong-current harness 13 during a front collision can be reduced.

Because the strong-current harness 13 has a larger diameter and a higher bending rigidity than a light-current harness, the strong-current harness is harder to flex and a load is more easily applied to flexing. However, the load can be reduced even with a strong-current harness 13 that is hard to flex, by providing the harness through-hole 14 through which the strong-current harness 13 runs at a position between the strong-current connector terminal 57C and the clip-fixing position 87a as described above.

Particularly in the harness routing structure of embodiment 1, the harness through-hole 14 is formed in a position that does not interfere with the cross member 12. Therefore, the strength of the cross member 12 is not diminished by the harness through-hole 14.

The grommet 15 is provided inside the harness through-hole 14. Because the grommet 15 elastically deforms to allow flexural deformation of the strong-current harness 13, the flexural deformation of the strong-current harness 13 is not obstructed during that deformation, and the strong-current harness 13 can be prevented from directly contacting the edge part 14a of the harness through-hole 14. The load acting on the strong-current harness 13 during a front collision can be further reduced thereby.

A plurality of recessed parts 15d open to the cabin space R moreover are formed on the flange part 15b of the grommet 15. Therefore, the strength needed to secure the strong-current harness 13 by provision of the grommet 15 can be reduced, and the deformation-conforming performance during flexural deformation of the strong-current harness 13 can be improved.

Harness Routing Operation During Side Collision

Figure 8:
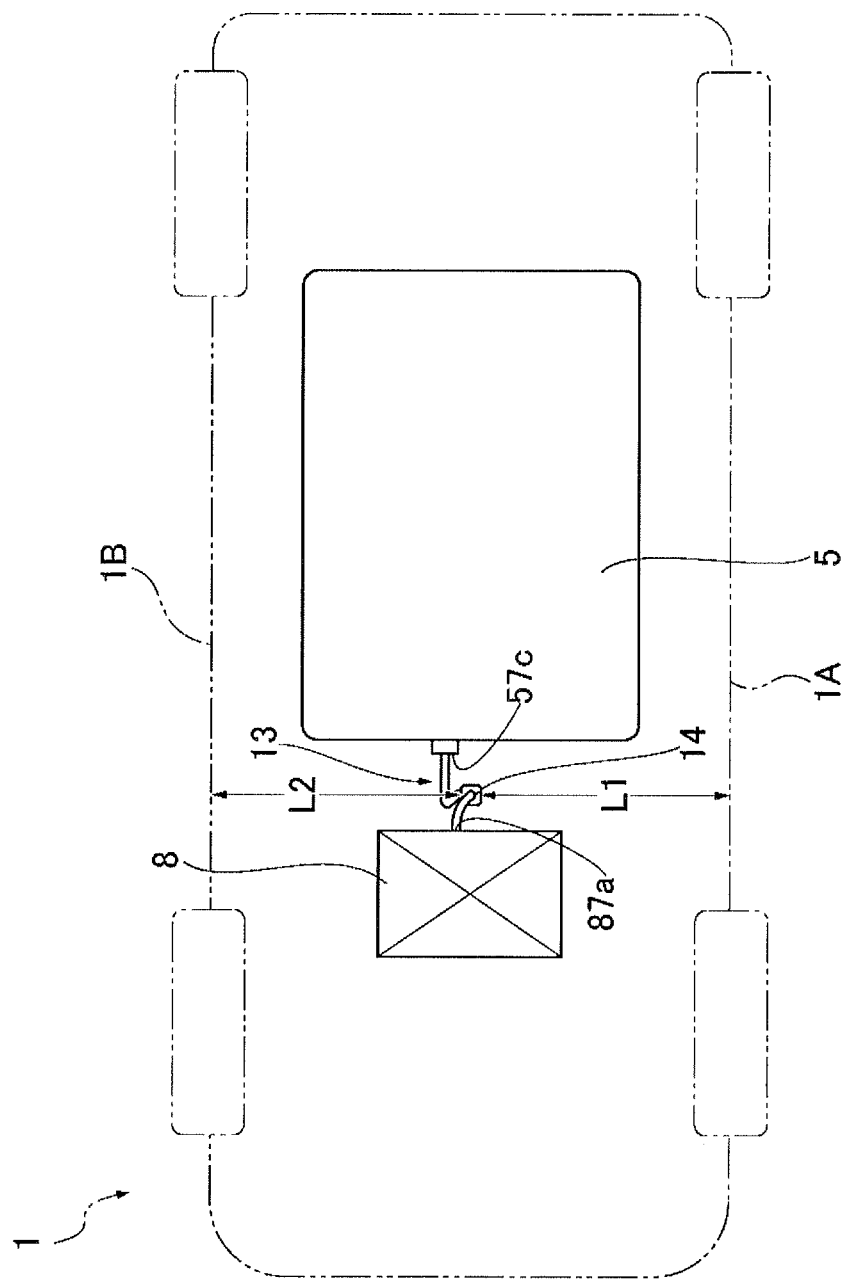
FIG. 8 is a plan view schematically illustrating the positional relationship between the battery pack and the air conditioning unit.

FIG. 8 is a plan view typically illustrating the positional relationship between the battery pack and the air conditioning unit.

In the harness routing structure of embodiment 1, the strong-current connector terminal 57C of the battery pack 5 disposed in the below-floor space Y is set in the vehicle-widthwise middle position, and the clip-fixing position 87a of the air conditioning unit 8 disposed in the cabin space R is set in the vehicle-widthwise middle position, as illustrated in FIG. 8. The harness through-hole 14 formed in the floor panel 10 furthermore is set in the vehicle-widthwise middle position. That is, the position in the vehicle-width direction of the strong-current connector terminal 57C, the position in the vehicle-width direction of the harness through-hole 14, and the position in the vehicle-width direction of the clip-fixing position 87a are arranged to coincide.

Therefore, in the event of a side collision of the electric vehicle 1, the likelihood of the relative vehicle-width-direction positional relationships among the strong-current connector terminal 57C, the harness through-hole 14, and the clip-fixing position 87a changing can be reduced. The load acting on the strong-current harness 13 produced by the side collision can be reduced thereby.

Moreover, in the harness routing structure of embodiment 1, the strong-current connector terminal 57C, the harness through-hole 14, and the clip-fixing position 87a each are set in the vehicle-widthwise middle position. Therefore, the respective distances L1 and L2 from both side surfaces (indicated by 1A and 1B in FIG. 8) on the left and right of the electric vehicle 1 to the strong-current harness 13 are substantially the same.

The strong-current harness 13 thereby becomes most distant from both side surfaces 1A and 1B on the left and right of the electric vehicle 1, and the load acting on the strong-current harness 13 during a side collision can be further suppressed.

The effects are next described. The effects listed below can be obtained with the harness routing structure for an electric vehicle of the first embodiment.

(1) A harness routing structure for electric vehicle, comprising: a below-floor component (battery pack) 5 disposed below a floor panel 10 partitioning a cabin space R and a below-floor space Y; an above-floor component (PTC heater) 84 disposed above the floor panel 10 and further toward a front of the vehicle than the below-floor component 5; a harness (strong-current harness) 13 connecting the below-floor component 5 and the above-floor component 84; and a harness through-hole 14 formed in the floor panel 10, the harness 13 running through the through-hole 14. The harness through-hole 14 is located in an intermediate position in a vehicle-length direction between a below-floor harness connection position (strong-current connector terminal) 57C of the below-floor component 5 where one end 13a of the harness 13 is connected and an above-floor harness connection position (clip-fixing position) 87a of the above-floor component 84 where the other end 13b of the harness 13 is connected. By this configuration, the load acting on the harness 13 running through the floor panel 10 in the event of a front collision of the vehicle can be reduced.

(2) A configuration in which a vehicle-width position of the below-floor harness connection position (strong-current connector terminal) 57C, a vehicle-width position of the harness through-hole 14, and a vehicle-width position of the above-floor harness connection position (clip-fixing position) 87a are arranged to coincide. By this configuration, the load acting on the harness (strong-current harness) 13 running through the floor panel 10 in the event of a side collision of the vehicle can be reduced.

(3) A configuration in which the below-floor harness connection position (strong-current connector terminal) 57C, the harness through-hole 14, and the above-floor harness connection position (clip-fixing position) 87a are set in a vehicle-widthwise middle position. By this configuration, the load acting on the harness 13 in the event of a side collision of the vehicle can be further reduced by arranging the harness 13 running through the floor panel 10 to be distant from both vehicle side surfaces 1A and 1B.

(4) A configuration in which: the floor panel 10 is supported by a cross member 12 extending in a vehicle-width direction; and the harness through-hole 14 is set in a position that does not interfere with the cross member 12. By this configuration, the harness through-hole 14 can be formed without decreasing the strength of the cross member 12.

(5) A configuration in which an elastically deformable grommet 15 for allowing flexural deformation of the harness (strong-current harness) 13 is provided in the harness through-hole 14. By this configuration, the flexural deformation of the harness 13 is not obstructed, the harness 13 can be prevented from directly contacting the edge part 14a of the harness through-hole 14, and the load acting on the harness 13 during a front collision can be further reduced.

(6) A configuration in which: the below-floor component and the above-floor component are strong-current components (battery pack 5 and PTC heater 84) in which a line voltage is at or above a predetermined value; and the harness is a strong-current harness 13 for connecting the strong-current components. By this configuration, the diameter can be made comparatively thicker so that flexing is more difficult compared with a light-current harness, and even a strong-current harness that is easily applied with a load when being flexed can be flexed in a reasonable manner, and therefore the load on the harness can be reduced.

(7) A configuration in which: the below-floor component is a battery pack 5 to serve as a power source of a travel motor 2; and the above-floor component is an electric heating wire heater (PTC heater) 84 provided inside an air conditioning unit 8 disposed at the front of the vehicle. By this configuration, the load acting on the harness 13 connecting the battery pack 5 and the PTC heater 84 during a front collision can be reduced.

The harness routing structure for an electric vehicle of the present invention was described above based on the first embodiment, but the specific configuration is not provided by way of limitation thereto; changes or additions to the design, etc., are permitted to that extent that there is no deviation from the main point of the invention according to the claims.

In the first embodiment, the below-floor component disposed below the floor panel 10 was a battery pack 5, and the above-floor component disposed above the floor panel 10 was a PTC heater 84 inside an air conditioning unit 8. However, no limitation is provided thereby; the component may be any kind provided that the component is carried onboard a vehicle. For example, the component may be a drive motor inverter 3, an electric compressor for circulating a coolant in an air conditioning unit 8, or the like. The component also may be a light-current component having comparatively low line voltage.

In the first embodiment, the grommet 15 was provided in the harness through-hole 14 to close off the harness through-hole 14, but a gap may be provided between the strong-current harness 13 and the edge part 14a of the harness through-hole 14. In this case, it can be arranged so that the strong-current harness 13 is less likely to contact with the edge part 14a of the harness through-hole 14, and the load acting on the strong-current harness 13 can be reduced.

The harness routing structure for an electric vehicle of the first embodiment was illustrated as being applied to the electric vehicle 1 that runs solely on electricity as a drive source, but no limitation is provided thereby; the vehicle may be a hybrid vehicle having a motor and an engine as drive sources, or a fuel cell vehicle, or the like. That is, the harness routing structure is applicable to any vehicle provided that onboard the vehicle are a pair of components in a vertical direction with a floor panel in between.

In the first embodiment, a component having a line voltage greater than 24 volts was used as the "strong-current component," but the voltage value delineating between strong-current component and light-current component can be set as desired.

The invention claimed is:

1. A harness routing structure for an electric vehicle, comprising:
    a floor panel partitioning a cabin space and a below-floor space, the floor panel having a harness through-hole;
    a below-floor component disposed below the floor panel;
    an above-floor component disposed above the floor panel and further toward a front of the vehicle than the below-floor component; and
    a harness electrically connecting the below-floor component and the above-floor component, the harness running through the through-hole,
    the harness through-hole being located, with respect to a vehicle-lengthwise direction of the floor panel, in an intermediate position between a below-floor harness connection position of the below-floor component to a first end of the harness and an above-floor harness connection position of the above-floor component to a second end of the harness.

2. The harness routing structure according to claim 1, wherein
    a vehicle-width position of the below-floor harness connection position of the below-floor component, a vehicle-width position of the harness through-hole, and a vehicle-width position of the above-floor harness connection position of the above-floor component are aligned with respect to a vehicle-widthwise direction of the floor panel.

3. The harness routing structure according to claim 2, wherein
    the below-floor harness connection position, the harness through-hole, and the above-floor harness connection position are located in a vehicle-widthwise middle position with respect to the vehicle-widthwise direction of the floor panel.

4. The harness routing structure according to claim 1, wherein
    the floor panel is supported by a cross member extending in a vehicle-widthwise direction of the floor panel; and
    the harness through-hole is located in a position that does not interfere with the cross member.

5. The harness routing structure according to claim 1, wherein
    the floor panel includes an elastically deformable grommet located in the harness through-hole and configured to provide for flexural deformation of the harness.

6. The harness routing structure according to claim 1, wherein
    the below-floor component and the above-floor component are strong-current components in which a line voltage is at or above a predetermined value; and
    the harness is a strong-current harness having a load capacity for connecting the strong-current components.

7. The harness routing structure according to claim 6, wherein
    the below-floor component is a battery pack that serves as a power source of a travel motor; and
    the above-floor component is an electric heating wire heater provided inside an air conditioning unit that is disposed at the front of the vehicle.

8. The harness routing structure for an electric vehicle according to claim 2, wherein
    the floor panel is supported by a cross member extending in a vehicle-widthwise direction of the floor panel; and
    the harness through-hole is located in a position that does not interfere with the cross member.

9. The harness routing structure according to claim 2, wherein
    the floor panel includes an elastically deformable grommet located in the harness through-hole and configured to provide for flexural deformation of the harness.

10. The harness routing structure according to claim 2, wherein
    the below-floor component and the above-floor component are strong-current components in which a line voltage is at or above a predetermined value; and
    the harness is a strong-current harness having a load capacity for connecting the strong-current components.

11. The harness routing structure according to claim 10, wherein
    the below-floor component is a battery pack that serves as a power source of a travel motor; and the above-floor component is an electric heating wire heater provided inside an air conditioning unit that is disposed at the front of the vehicle.

12. The harness routing structure for an electric vehicle according to claim 3, wherein
the floor panel is supported by a cross member extending in a vehicle-widthwise direction of the floor panel; and
the harness through-hole is located in a position that does not interfere with the cross member.

13. The harness routing structure according to claim 3, wherein
the floor panel includes an elastically deformable grommet located in the harness through-hole and configured to provide for flexural deformation of the harness.

14. The harness routing structure according to claim 3, wherein
the below-floor component and the above-floor component are strong-current components in which a line voltage is at or above a predetermined value; and
the harness is a strong-current harness having a load capacity for connecting the strong-current components.

15. The harness routing structure according to claim 14, wherein
the below-floor component is a battery pack that serves as a power source of a travel motor; and
the above-floor component is an electric heating wire heater provided inside an air conditioning unit that is disposed at the front of the vehicle.

16. The harness routing structure according to claim 4, wherein
the floor panel includes an elastically deformable grommet located in the harness through-hole and configured to provide for flexural deformation of the harness.

17. The harness routing structure according to claim 4, wherein
the below-floor component and the above-floor component are strong-current components in which a line voltage is at or above a predetermined value; and
the harness is a strong-current harness having a load capacity for connecting the strong-current components.

18. The harness routing structure according to claim 17, wherein
the below-floor component is a battery pack that serves as a power source of a travel motor; and
the above-floor component is an electric heating wire heater provided inside an air conditioning unit that is disposed at the front of the vehicle.

* * * * *